United States Patent [19]
Rouverol

[11] 3,937,098
[45] Feb. 10, 1976

[54] HIGH TORQUE GEARING

[76] Inventor: William S. Rouverol, P.O. Box 9122, Berkeley, Calif. 94709

[22] Filed: Dec. 4, 1974

[21] Appl. No.: 529,298

Related U.S. Application Data

[63] Continuation-in-part of Ser. No. 524,419, Nov. 18, 1974, abandoned.

[52] U.S. Cl. .................................................. 74/462
[51] Int. Cl.² ............................................ F16H 55/06
[58] Field of Search ............................. 74/457, 462

[56] References Cited
UNITED STATES PATENTS

| | | | |
|---|---|---|---|
| 3,438,279 | 4/1969 | Rouverol | 74/462 |
| 3,824,873 | 7/1974 | Rouverol | 74/462 |

*Primary Examiner*—Leonard H. Gerin
*Attorney, Agent, or Firm*—Gordon Wood

[57] ABSTRACT

Gear tooth profiles that afford greater torque capacity than is obtainable from involute gears of corresponding size and materials. Maximum contact stress is reduced by using profile curves that give exceptionally long radii of relative curvature at the pitch point, and interference problems with such profiles are avoided by utilizing a two-segment line of action. When the gears are not carrying a torque load each tooth profile in the transverse plane passes successively through two points of contact but are out of contact at points in between. As the torque load increases, the two contact zones widen until they coalesce.

15 Claims, 6 Drawing Figures

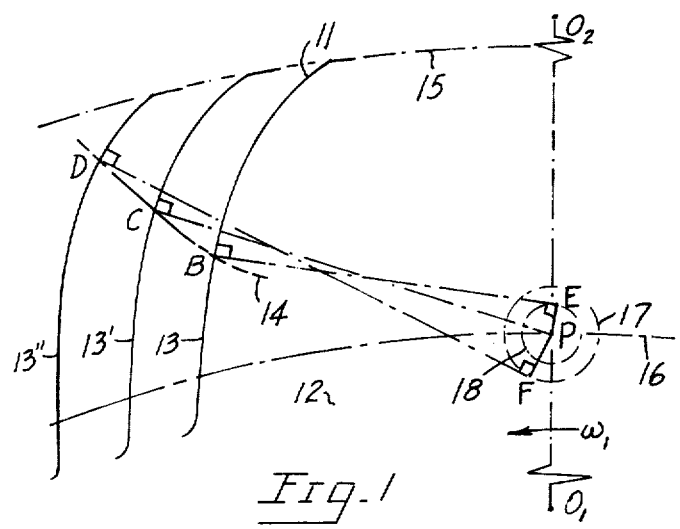
Fig. 1
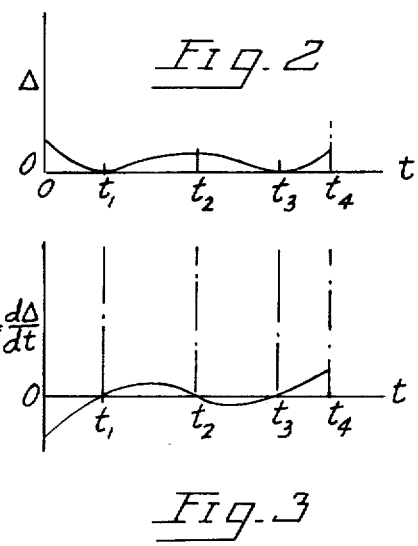
Fig. 2
Fig. 3
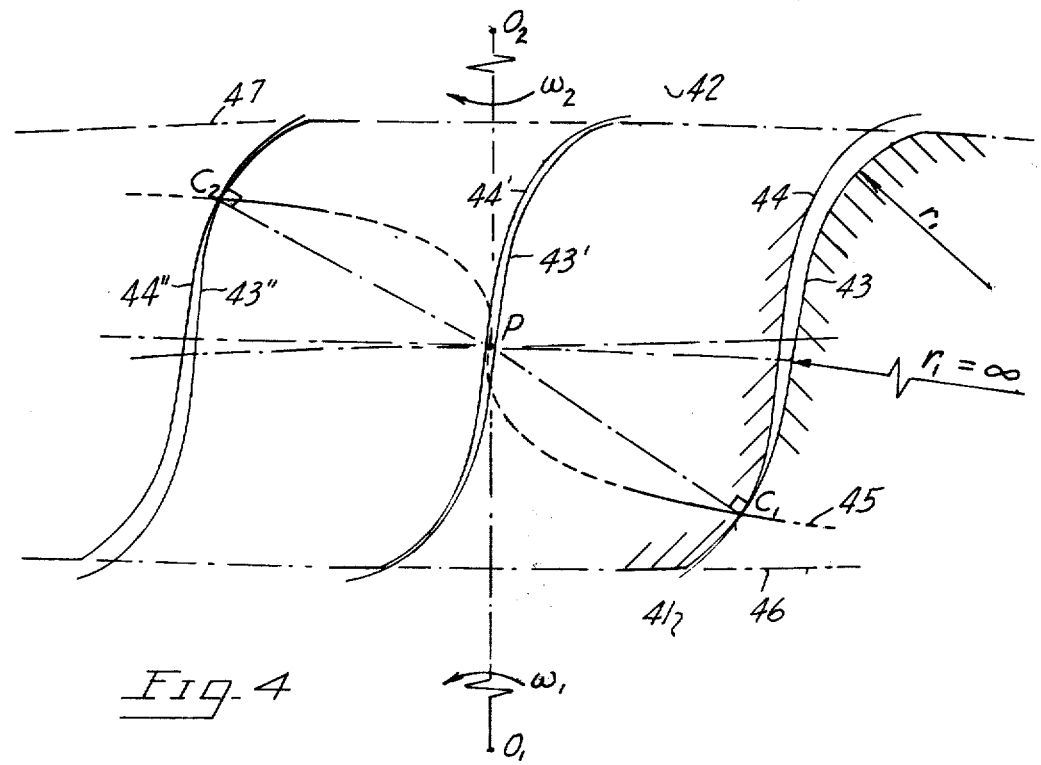
Fig. 4
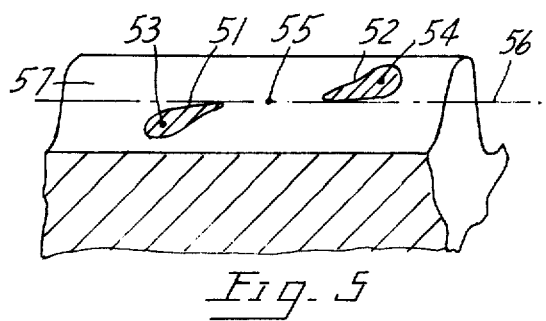
Fig. 5
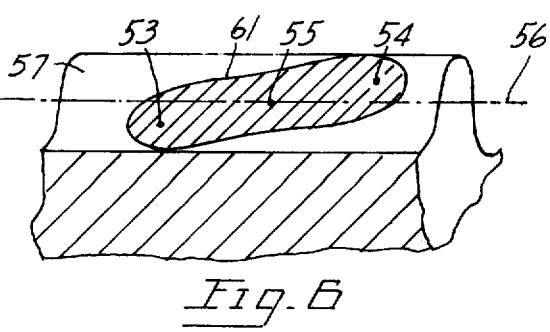
Fig. 6

HIGH TORQUE GEARING

This application is a continuation-in-part of application Ser. No. 524,419 filed Nov. 18, 1974, now abandoned.

This invention relates to the profile and shape of gear teeth. Specifically, it relates to tooth profiles that increase the torque capacity of gear sets. The invention is applicable to all types of gearing.

The prior art includes many patents covering gear tooth profiles designed to afford torque capacities superior to those of involute profiles. Examples are U.S. Pat. Nos. 3,220,279 to Dareing; 2,128,815 to Guest; 2,808,732 to Champion; 1,973,185 to Trbojevich; 3,180,172 to Leggatt; 3,371,552 to Soper; 1,538,328 to Holdener; 3,631,736 to Saari; British Pat. Nos. 186,436 to Bostock and Bramley-Moore and 206,163 to Wildhaber; U.S. Pat. No. 1,501,750 to Wildhaber; and U.S.S.R. Pat. No. 109,750 to Novikov.

Of the various gear types disclosed in these patents, most never reached the production stage, and only the gearing covered by the last three, known variously as Wildhaber-Novikov, "W–N", or Novikov gearing, has been employed in a significant number of applications. This is because this latter type of gearing has a torque capacity two or three times that of involute gearing, providing it is mounted with sufficient care.

The disadvantage of Novikov gearing, however, is that the mounting conditions are very severe: center-distance tolerances are extremely tight, by virtue of the fact that the high torque capacity is obtained by very intimate conformity between circular arc profiles having centers only a few thousandths of an inch apart. Since the pressure line must pass through these centers, even a small amount of positive center-distance error, or shaft or bearing deflection in response to separating forces, produces major reductions in the pressure angle. In extreme cases these effects can reduce the pressure angle from the design value of 30° to a value close to zero, and as a result the entire tooth load may be thrown onto the tips of the concave teeth. If this occurs, the operation becomes rough and noisy, and tooth breakage becomes a serious problem.

The object of the present invention is therefore to remedy the deficiencies of the Novikov gear tooth profile by providing one that has a comparable torque capacity but is less sensitive to center-distance errors.

The means to achieve this and other objects and advantages of the invention will be evident from the drawings as explained in the specification that follows:

FIG. 1 is a schematic view of a gear tooth profile in the transverse plane at positions near a "culmination point."

FIG. 2 is a graph of the separation between a pair of mating tooth profiles passing through the meshing zone, plotted as a function of time.

FIG. 3 is a graph of the first derivative with respect to time of the curve of FIG. 2, and hence is a plot of the velocity of approach or separation of the mating profiles.

FIG. 4 is a sectional view of a pair of inflected mating tooth profiles in three successive positions.

FIG. 5 is a helical tooth viewed normal to the helix direction showing the discrete contact areas surrounding the culmination points at low torque loads.

FIG. 6 is the same view but with an increased torque load sufficient to cause the two discrete contact areas of FIG. 5 to coalesce into a single continuous contact area.

In detail and referring to FIG. 1, a gear tooth 11 on a gear generally designated 12 has an active profile 13 shown in three successive positions 13, 13' and 13", and a path of contact 14 with its mating tooth (not shown). The addendum and pitch circles are 15 and 16 respectively. As the gear 12 turns about its center $O_1$ in the direction indicated by the arrow, the profile 13 intersects the path of action 14 at points B, C and D successively. The normal to the profile in these three positions are BE, CP and DF respectively.

It will be noted that only one of these normals, CP, passes through the pitch point P. The other two are tangent at points E and F to concentric circles 17, 18 centered at P and having radii EP and FP respectively. Because these normals do not pass through the pitch point P, the profile 13 is non-conjugate at points B and D. This means that a pair of mating profiles in contact at these points will not be transmitting angular motion in proportion to the velocity ratio ($PO_2/PO_1$, where $O_2$ is the center of the driven gear), or, if the velocity ratio for the mating pair is maintained by virtue of the fact that the teeth are helical and at least one pair of mating profiles are in contact at a point such as C in another transverse plane, then the profiles at B or D must be either overtaking each other or separating (or if the gears are under load, compressing or decompressing each other).

It may be shown that if a pair of mating gear tooth profiles have a common normal at the contact point that passes the pitch point P at a distance d, then the relative velocity $v_r$ with which these profiles are approaching each other or receding from each other (assuming the velocity ratio is held constant by one or more profiles at the pitch point) is expressed by the equation $$v_r = w_1 (1 + 1/G) d \qquad (1)$$

where $w_1$ is the angular velocity of the driving gear and G is the velocity ratio. If the common normal intersects the line of centers $O_1 O_2$ between the pitch point P and the center of the driven gear $O_2$ (such as BE), then the profiles are approaching each other; similarly, if it intersects the line of centers between the pitch point P and the center of the driving gear $O_1$ (such as DF) then the profiles are separating. Consequently if the profiles shown in FIG. 1 are transmitting torque, the peak stress in the center of the contact area, and also the size of the contact area, will be increasing as the contact point moves from B to C, then decreasing as the contact point moves from C to D. For this reason the point C is called a "culmination" (c.f., Prof. M. J. French, "Conformity of Circular-Arc Gears," Journal of Mechanical Engineering Science, Vol. 7, No. 2, 1965, pg. 220-233), or in this specification, a "culmination point."

In summary, the term "culmination point", as used in this specification and the claims, means a point on a path of contact at which the common normal to the contacting surfaces intersects the pitch line, while points on the path of contact before and beyond have common normals that pass on the driven gear and driving gear side of the pitch line respectively.

A distinguishing feature of the present gearing invention is that during the tooth engagement-disengagement process, mating profiles pass through two culmination points, between which the profiles will be out of contact when the gears are lightly loaded. The essential condition to achieve this characteristic is that the relative radius of curvature of the mating profiles at some position between the culmination points must be greater than that of an involute gear of the same pressure angle (i.e., greater than $$\sin \phi / \left[ \frac{1}{R_1} + \frac{1}{R_2} \right].$$

where $R_1$ and $R_2$ are the pitch line and $\phi$ is the pressure angle).

It should be noted that between the two culmination points there will be a point where the separation between the mating profiles will reach a maximum. At this point, which in the present specification and claims is called the "intermediate point", the common normal to the mating tooth surfaces also intersects the pitch line. If the gears are heavily loaded, the mating tooth surfaces may be in contact at this intermediate point as well as at the culmination points. In fact optimum profile design will be realized only when the contact stress at the intermediate point is substantially as great as that at the culmination points.

The type of approach-separation schedule characteristic of gear tooth profiles embodying the invention is shown in FIG. 2. This is a graph of the separation between a pair of mating tooth profiles passing through the meshing zone, plotted as a function of time $t$. For gears turning at constant speed, angular displacement will be a linear function of time, so a plot of against angular displacement would to an appropriate scale be a curve of the same shape.

In the graph of FIG. 2, time zero is when the addendum of the driven gear tooth first intersects the path of action; $t_1$, $t_2$ and $t_3$ denote the times at which the profile passes the first culmination point, the intermediate point, and the second culmination point, respectively, and $t_4$ is the time when the addendum of the driving gear intersects the path of action. It will be evident from FIG. 2 that when the gears are lightly loaded, there will be contact between the mating profiles only at times $t_1$ and $t_3$, and only when the torque load is heavy enough to produce local surface deformation in excess of the value of $\Delta$ at $t_2$ will there be a single continuous path of action.

FIG. 3 is a graph of the first derivative with respect to time of the curve of FIG. 2 and hence is a plot of the velocity of approach or separation of the mating profiles. This curve will of course have a zero ordinate at those points where the curve of FIG. 2 has a horizontal tangent, indicating the points of minimum ($t_1$ and $t_3$) and maximum ($t_2$) separation. Positive (above the t-axis) values of $v_c$ in FIG. 3 indicate the common normals pass the pitch point on the driving gear side (as line DF in FIG. 1), and conversely, negative (below the t-axis) values indicate they pass on the driven gear side (as line BE).

It has been stated (U.S. Pat. No. 3,631,736) that there are three curves involved in gear tooth profile synthesis, namely the profiles of the mating teeth and the path of contact, and that the specifying of any one of these curves fully determines the other two. This is true for conjugate gears but not for nonconjugate gears. For the latter, a separation or separation velocity curve such as plotted in FIGS. 2 or 3 constitutes a fourth determinative curve, and full specification of the gears then requires the stipulation of two of the four curves.

Consequently curves of the type shown in FIGS. 2 or 3 may be used in the development of gear tooth profiles embodying the invention, or if gear tooth profiles embodying the invention are given, these curves enable the surface loading schedule to be determined so that the gears can be rated with respect to torque capacity. In the former case, profile synthesis involves several steps: (a) the use of the ordinates of FIG. 3 to determine $v_c$, then the use of Equation 1 to calculate a series of values for d (the radii of the family of circles centered at P as in FIG. 1); (b) the construction of tangents to these circles to points on the path of contact that correspond to the appropriate angular displacements of the profile being synthesized; (c) the measurement of the length of lines from these points to the center of the gear and the angle the abovementioned tangents make to these lines; and (d), the construction of the profile curve from this data. The last step involves a graphical integration of the general equation relating profile tangent angle and radius vector:

$$\tan \phi = \frac{du}{ud\theta} \qquad (2)$$

where $\phi$ is the profile tangent angle (or pressure angle at the point under consideration), $u$ is the length of the radius vector, and $\theta$ is the central angle for polar coordinate plot of the profile curve.

The above method of profile synthesis is predominantly graphical, but since the basic rack profile for hobs or shapers used to generate the gearing herein disclosed is designed by the conventional graphical "roll-out" procedures, this graphical approach to the synthesis of the profile curve is not especially disadvantageous.

An alternate approach to designing gears embodying the present invention is to start with a specified profile curve having one or more desirable properties and expressable by a mathematical equation having sufficient coefficients or constant factors to allow the desired tooth loading schedule to be realized. Many curves of both the inflected or uninflected (FIG. 1) variety are feasible, depending on the shape of the path of contact and the prescribed surface loading schedule (FIG. 3). The culmination points may both be on one side of the plane containing the gear axes, or may straddle it at equal or unequal distances. The intermediate point may be at the pitch point, or it may be to one side of it, in which case the path of contact may not even intersect the plane of the gear axes at the pitch point. Addendum and dedendum heights may be equal or unequal, the latter for generally the same reasons involute gear addenda are made unequal on gear and pinion, such as to reduce undercutting or to obtain smoother engagement or greater bending strength in the pinion teeth.

For uninflected tooth profiles, such as those shown in FIG. 1, almost any curve can be made to work if the path of contact and the mating profile are appropriate. Even a straight profile or plain circular arc will work if mated with a suitable nonuniform radius curve, such as an elliptic arc of the proper eccentricity.

Inflected profile curves, such as that shown in FIG. 4, afford certain advantages relative to uninflected profiles, including improved tooth bending strength and possibilities for shorter path lengths that reduce friction, heating and wear and afford more favorable slide-roll ratios and lubricant-trapping properties. Many continuous mathematical functions having at least one point of inflection can be used as profile curves, such as trigonometric and hyperbolic functions, or exponential functions of the form $$y = Cx^n, \qquad (3)$$

where $n$ is any number greater than 2.00 so that the second derivative of $y$ with respect to $x$ goes to zero at the origin and hence produces an infinite radius of curvature at that point.

Most of these functions, however, have some attendant disadvantage, such as limitations in the way the curvature varies or having a knee at some inconvenient point. For example, if the exponent n in Equation 3 is three, the resulting function is called a cubic curve and has a radius of curvature that declines to the knee at a curve tangent angle of 24° 5', then begins to increase. The knee consequently produces a local stress increase, and the increasing radius of curvature may produce separation problems unless the difference in total curvature of the mating profiles is increased.

The curve that has the greatest number of advantages and the fewest disadvantages for use in gear teeth embodying the invention is one called a railway transition spiral. It has the general form $$r_1 = C/s^m \qquad (4)$$

where $r_1$ is the radius of curvature, C is a constant that controls the curvature rate, $s$ is the distance from the origin measured along the curve, and m is an exponent greater than zero. The particular form of curve used to connect a straight section of railway track or highway to a constant radius curved portion uses an exponent m equal to unity, and has the essential property of giving an infinite radius of curvature at the origin (i.e., where $s$ is zero). Since the radius of curvature is also equal to $ds/d\alpha$, where $\alpha$ is the direction angle of the curve, it will be evident that the equation for the railway spiral can be integrated to give $$\alpha = s^2/2C \qquad (5)$$

Expressed in this form, the railway spiral may be seen to be the third of a series of simple and fundamental curves that include $\alpha = \frac{1}{2}C$, which is a straight line, and $\alpha = s/2C$, which is a circle of radius 2C.

By taking the sine or cosine of both sides of Equation 5 and noting that $\sin \alpha = dy/ds$ and $\cos \alpha = dx/ds$, one may expand the resulting expressions by Maclaurin's formula and integrate term by term to obtain parametric equations for the railway spiral in rectilinear coordinates.

In FIG. 4 a driving gear 41 centered at $0_1$ drives a gear 42 centered at $0_2$. The tooth profile of gears 41, 42 are of the railway spiral form and are shown in three successive positions 43, 43', 43'' and 44, 44', 44'' respectively. The path of contact 45 starts at the addendum circle 46 of gear 42, passes through culmination point $C_1$, pitch point P, culmination point $C_2$, and ends at the addendum circle 47 of gear 41. Because the radius of curvature $r_1$ is infinite at the pitch point, the path 45 has the same slope as the profiles 43, 44 at that point. It will be noted that the common normals at $C_1$ and $C_2$ both pass through the pitch point P, but the profiles are not in contact at that point. Since the profiles make contact at the pitch point P only when heavily loaded, the path of contact 45 is shown as a broken line in that region. The path 45 is seen to be quite steep and short in this particular configuration. The entire meshing action takes place quite close to the pitch point P, so relative sliding on the tooth surfaces will be minimal and consequently the friction, heating and wear correspondingly low. If a longer, flatter path of contact were to be used, the gears would be less sensitive to center-distance errors, but the torque capacity would be reduced and the friction, heating and wear increased.

A wide variety of pressure angles may be used in gear teeth embodying the present invention. The large separating forces associated with high pressure angles cause elastic deformations in the gear mountings that effect increases in center-distance error. Consequently heavy torque loads may be best accommodated by pressure angles in the range from zero to 10°. On the other hand minimum friction and wear will be attained by the use of pressure angles as high as 45° or more.

It may be noted in connection with the gear teeth shown in FIG. 4 that if the addendum of one of the gears and the dedendum of the other are eliminated, a gearing system similar to conventional Novikov gearing will be obtained, except that the profile curves would be railway spirals instead of circular arcs. This leads to a slight reduction in load capacity, but because the profiles are not in contact at P except when very heavily loaded, the teeth are much less prone to tooth breakage as a result of center-distance errors. However they are not as resistant to breakage as inflected tooth profiles generally, for the reason that while the doubled working depth of inflected teeth doubles the bending moment the doubled pitch increases the tooth beam strength fourfold.

In applications where particularly high torque must be carried and center-distances can be closely controlled, it may be desirable to combine some of the characteristics of the gearing herein disclosed with those of the Novikov system. Just as the usual railway curve has a central portion that is an ordinary circular arc, in order to prevent the rapidly increasing curvature of the transition spiral from leading to an amount of superelevation that would cause slow-moving trains to tip over, so the outer portions of a railway spiral tooth curve may be changed to a plain circular or elliptic arc form.

This produces what is called a "composite" tooth profile, and while such profiles can be hobbed if there are no discontinuities in curvature, they present a problem to the designer seeking to calculate allowable load. A better alternative is to vary the parameters of the profile curve equations to meet the needs of the particular gear-set being designed. Whereas the traditional railway spiral uses a value of unity for the exponent $m$ in Equation 4 in order to maximize passenger comfort and minimize "jerk" (the third derivative of arc distance $s$ with respect to time), no such limitation applies to railway spiral curves used in gear teeth. A wide range of integral and nonintegral values for the constants and exponents in Equations 3 and 4 may be used to obtain desired positions, shapes and sizes of the contact areas, and these values will frequently be unequal for engaging portions of the mating profiles.

The discontinuous contact areas 51, 52 that characterize this type of gearing are shown in FIG. 5. In this figure the tooth is viewed in a direction normal to the helix direction. The culmination points are indicated at 53, 54 and the intermediate point at 55, in this case located on the line 56 representing the intersection of the pitch surface and the tooth surface 57.

FIG. 6 shows how the two discrete contact areas 51, 52 of FIG. 5 have been enlarged by the application of additional torque, so that they coalesce to form a single continuous contact area 61. The shape of this area 61 will vary greatly depending on the profile curves used, but in correctly designed gears will have its innermost and outermost extremities substantially tangent to the addendum circles of the mating gears. The contact areas 51, 52 in FIGS. 5 and 61 in FIG. 6 will translate lengthwise on the tooth surface as the gears are rotated, at a rate depending on the helix angle.

The gearing herein disclosed can be manufactured by all standard gear fabrication techniques. As noted above, hob and shaper profiles must be formed to the basic rack profile as determined by the customary "roll-out" method. This leads to a basic rack profile that is conjugate to the gear being cut, even though two gears cut with such cutters will not be conjugate to each other, and the rack profile for a rack-and-pinion set will not be the same as the basic rack profile.

While the optimum gearing of the type herein disclosed will be helical (or spiral in the case of bevel gears), the deviations from conjugacy are extremely minute, on the order of ten thousandths of an inch. Consequently spur or straight bevel gears may operate quite smoothly, even as compared to standard involute gears, especially if the profiles can be designed so that the angle of turn between successive culmination points is substantially an integral number of pitch angles, preferably two. This will usually involve use of a rather flat path of contact and a low pressure angle.

This specification and the following claims have been directed toward certain characteristics of gear tooth profiles defined for the transverse plane. It will be appreciated that in the case of helical or spiral bevel gears it may be desirable to form cutting tools to curves specified in the normal plane. For all the curves specified herein there exist analogous curves in the normal plane, and standardized procedures are available for converting profile points from the normal to the transverse plane and vice versa. Consequently the conceptions and mathematical relations contained herein should be construed as applying equally to tooth profiles in the transverse and normal planes.

The effect of minor center-distance errors on the preferred form of the invention shown in FIG. 4 will be evident from a consideration of the relationship of the mating profiles. Mounting the gears with two small a center-distance simply increases the profile conformity and shifts the culmination points to positions slightly further from the pitch point which slightly increases the separating forces. Conversely, mounting the gears too far apart produces opposite shifts, but there will be no major change in torque capacity and no tendency to load the tips of the driven teeth and promote breakage of them such as occurs in Novikov gearing.

The effect of wear on the embodiment of FIG. 4 is generally less detrimental than it is in the case of involute teeth. The maximum contact stress will be at the culmination points, but wear at these points will shift these points and the main tooth surface loads closer to the pitch point. As the relative radius of curvature at that point is infinite, increased load there is not detrimental. The more rapid sliding and wear of the tooth tips and roots also causes a gradual shift of load toward the pitch line in the case of involute gears, but involute gears do not have the advantages of a low design stress and infinite relative radius of curvature at that point. Consequently the pitch line area is usually the region where involute gears first show surface fatigue damage from overstressing.

In this specification and the following claims, the following terms have the following meanings: "pitch surface" means the surface of revolution that would be generated by the pitch line moving about a gear axis at a uniform distance; pressure angle means the angle between a tangent to the tooth surface and a radial line, measured in the transverse plane at the pitch surface; pitch angle means the central angle subtended by one circular pitch arc in the transverse plane; path of contact means the locus of points of the centers of the intersection line between the contact area and the transverse plane containing the path of contact, and because the gears herein disclosed are non-conjugate will grow longer or shorter depending on how much torque is being transmitted; total curvature means the angle subtended by tangents to the extreme ends of a working profile; and total relative curvature means the difference in total curvature of a pair of mating profiles.

I claim:

1. In a pair of toothed gears,
    mating teeth formed to have active profiles perpendicular to the pitch line of said pair which have at least one culmination point substantially removed from said pitch line,
    said profiles of at least one of said pair having a portion with curvature that increases with distance from the pitch surface of said one of said pair.

2. A pair of toothed gears according to claim 1 wherein said teeth extend across the rims of said gears in a direction slantingly disposed with respect to the pitch line of said pair.

3. A pair of toothed gears according to claim 2 wherein said direction has sufficient slant to produce at least one tooth overlap in the face width of said pair.

4. A pair of toothed gears according to claim 1 wherein said portion comprises a curve of the form $r_1 = C/s^m$, where $r_1$ is the radius of curvature, s is the distance along the curve from the origin, m is an exponent greater than zero, and C is a constant.

5. A pair of toothed gears according to claim 4 wherein said exponent has the value of unity.

6. A pair of toothed gears according to claim 1 wherein said portion comprises an exponential curve of the form $y = Cx^n$, where C is a constant, n is a number greater than 2.00, x is the profile coordinate measured perpendicular to the pressure angle, and y is the coordinate of the profile curve measured at right angles to the x-direction.

7. A pair of toothed gears according to claim 1 wherein said profiles have a total relative curvature that produces areas of contact between mating teeth that are substantially tangent to the addendum surfaces of said teeth when said gears are transmitting the maximum allowable torque.

8. A pair of toothed gears according to claim 1 wherein said profiles extend on both sides of the pitch surface of said one of said pair.

9. A pair of toothed gears according to claim 8 wherein said profiles are oppositely curved on opposite sides of said pitch surface.

10. A pair of toothed gears according to claim 9 wherein said profiles have a point with an infinite radius of curvature.

11. A pair of toothed gears according to claim 9 wherein said profiles have two culmination points.

12. A pair of toothed gears according to claim 11 wherein said two culmination points are on opposite sides of said pitch surface.

13. A pair of toothed gears according to claim 1 wherein said portion comprises the entire active profile of said one of said pair.

14. A pair of toothed gears according to claim 1 wherein said portion comprises the entire active profile of each of said pair.

15. A pair of toothed gears according to claim 1 wherein each of said pair includes a portion comprising a curve of the form $r_1 = C/s^m$, where $r_1$ is the radius of curvature, $s$ is the distance along the curve from the origin, $m$ is an exponent greater than zero, and $C$ is a constant.

* * * * *